(12) United States Patent
Earl et al.

(10) Patent No.: US 12,546,283 B2
(45) Date of Patent: Feb. 10, 2026

(54) ELECTRICAL POWER GENERATED BY CARBON DIOXIDE GAS PRESSURE LETDOWN

(71) Applicant: Sapphire Technologies, Inc., Cerritos, CA (US)

(72) Inventors: Jeffrey Earl, Hermosa Beach, CA (US); Freddie Sarhan, Anaheim, CA (US)

(73) Assignee: Sapphire Technologies, Inc., Cerritos, CA (US)

( * ) Notice: Subject to any disclaimer, the term of this patent is extended or adjusted under 35 U.S.C. 154(b) by 0 days.

(21) Appl. No.: 18/191,646

(22) Filed: Mar. 28, 2023

(65) Prior Publication Data

US 2024/0328380 A1   Oct. 3, 2024

(51) Int. Cl.
*F03B 17/00* (2006.01)
*F03B 17/06* (2006.01)

(52) U.S. Cl.
CPC .................. *F03B 17/06* (2013.01)

(58) Field of Classification Search
CPC ....... F03B 17/06; F17D 1/075; H02K 7/1823; H02K 21/14
See application file for complete search history.

(56) References Cited

U.S. PATENT DOCUMENTS 4,740,711 A * 4/1988 Sato ...................... F01B 13/061
290/52
7,638,892 B2  12/2009 Myers 8,146,360 B2  4/2012 Myers et al.
8,384,232 B2  2/2013 Myers et al.
8,400,005 B2  3/2013 Huber et al.
(Continued)

FOREIGN PATENT DOCUMENTS

JP      6622696       11/2016
WO  WO 2019/210307   10/2019

OTHER PUBLICATIONS

Eia.gov [online], "Natural Gas Explained," available on or before Dec. 2020, last updated on Nov. 18, 2022, retrieved on Jun. 28, 2023, retrieved from URL<https://www.eia.gov/energyexplained/natural-gas/natural-gas-pipelines.php>, 2 pages.

(Continued)

*Primary Examiner* — Julio C. Gonzalez
(74) *Attorney, Agent, or Firm* — Fish & Richardson P.C.

(57) ABSTRACT

A system includes an inlet pipe, a pressure control valve, a flow-through electric generator, and an outlet pipe. The inlet pipe is connected to a carbon dioxide pipeline that flows carbon dioxide. The pressure control valve is installed on the inlet pipe and is configured to reduce a pressure of the carbon dioxide to a specified pressure. The flow-through electric generator includes a turbine wheel, a rotor, and a stator. The turbine wheel is configured to rotate in response to expansion of the carbon dioxide flowing into an inlet of the turbine wheel and out of an outlet of the turbine wheel. The flow-through electric generator is configured to generate electrical power upon rotation of the rotor within the stator. The outlet pipe is configured to receive the carbon dioxide that has expanded through the flow-through electric generator and flow the carbon dioxide to a carbon dioxide pipeline network.

10 Claims, 3 Drawing Sheets

(56) References Cited

U.S. PATENT DOCUMENTS

| | | | |
|---|---|---|---|
| 8,739,538 B2 | 6/2014 | Myers et al. | |
| 8,839,622 B2 | 9/2014 | Myers et al. | |
| 10,018,114 B2 | 7/2018 | Wardle et al. | |
| 10,288,347 B2 | 5/2019 | Lourenco et al. | |
| 11,611,263 B1 | 3/2023 | Sarhan et al. | |
| 11,795,873 B1 | 10/2023 | Liu et al. | |
| 2012/0013125 A1 | 1/2012 | Myers et al. | |
| 2012/0056431 A1* | 3/2012 | Bland | C10L 5/366 48/210 |
| 2013/0286591 A1 | 10/2013 | Myers et al. | |
| 2019/0331086 A1* | 10/2019 | Abe | F03B 15/02 |
| 2022/0195976 A1* | 6/2022 | Heald | F03B 13/00 |
| 2024/0026803 A1 | 1/2024 | Earl et al. | |
| 2025/0290004 A1 | 9/2025 | Earl et al. | |

OTHER PUBLICATIONS

Energy.gov [online], "Technical Targets for Proton Exchange Membrane Electrolysis," Apr. 2023, retrieved on Jun. 28, 2023, retrieved from URL<https://www.energy.gov/eere/fuelcells/technical-targets-proton-exchange-membrane-electrolysis>, 4 pages.

EPA.gov [online], "Sources of Greenhouse Gas Emissions," updated on Apr. 28, 2023, retrieved on Jun. 28, 2023, retrieved from URL<https://www.epa.gov/ghgemissions/sources-greenhouse-gas-emissions>, 25 pages.

Phmsa.dot.gov [online], "LNG Facility Siting," last updated on Aug. 12, 2022, retrieved on Jun. 28, 2023, retrieved from URL<https://www.phmsa.dot.gov/pipeline/liquified-natural-gas/lng-facility-siting>, 3 pages.

Tallgrass.com [online], "Tallgrass to Capture and Sequester CO2 Emissions from ADM Corn Processing Complex in Nebraska," May 18, 2022, retrieved on Jun. 28, 2023, retrieved from URL<https://www.tallgrass.com/newsroom/press-releases/tallgrass-to-capture-and-sequester-co2-emissions-from-adm-corn-processing-complex-in-nebraska>, 3 pages.

Wikipedia.org [online], "Carbon dioxide pressure-temperature phase diagram," available on or before Nov. 30, 2010, retrieved on Jun. 28, 2023, retrieved from URL<https://en.m.wikipedia.org/wiki/File:Carbon_dioxide_pressure-temperature_phase_diagram.svg>, 9 pages.

Giardinella et al., "Improve Energy Efficiency using expanders," Chemical Engineering, Apr. 1, 2021, p. 28-39.

International Search Report and Written Opinion in International Appln. No. PCT/US2024/021893, mailed on Jul. 23, 2024, 15 pages.

International Search Report and Written Opinion in International Appln. No. PCT/US2025/020219, mailed on Jul. 23, 2025, 15 pages.

\* cited by examiner

ELECTRICAL POWER GENERATED BY CARBON DIOXIDE GAS PRESSURE LETDOWN

TECHNICAL FIELD

This disclosure relates to power generation by gas pressure letdown.

BACKGROUND

Gas can be transported between locations via a pipe network. The efficient and effective movement of such gases from producing regions to consumption regions requires an extensive and elaborate transportation system. One example of such gas is natural gas, which is one of the principal sources of energy for many of our day-to-day needs and activities. Natural gas is an attractive fossil fuel for its abundance. Natural gas that is transported through pipelines travels at high pressure in the pipeline.

Another example of such gas is carbon dioxide due to the growing interest in the energy transition from fossil fuels to renewable and sustainable energy in a global effort to reduce carbon emissions. Some examples of de-carbonization pathways in the energy transition to renewable energy include increasing energy efficiency, producing and/or using lower-carbon fuels, and carbon capture and storage.

SUMMARY

This disclosure describes technologies relating to generating electrical power using gas expansion work. Certain aspects of the subject matter described can be implemented as a system. The system includes an inlet pipe, a pressure control valve, a flow-through electric generator, and an outlet pipe. The inlet pipe is connected to a carbon dioxide pipeline that flows carbon dioxide. The pressure control valve is installed on the inlet pipe. The pressure control valve is configured to reduce a pressure of the carbon dioxide to a specified pressure. The carbon dioxide at the specified pressure is in a gaseous state. The flow-through electric generator is coupled to the inlet pipe downstream of the pressure control valve. The flow-through electric generator includes a turbine wheel, a rotor, and a stator. The turbine wheel is configured to receive the carbon dioxide from the inlet pipe. The turbine wheel is configured to rotate in response to expansion of the carbon dioxide flowing into an inlet of the turbine wheel and out of an outlet of the turbine wheel. The rotor is coupled to the turbine wheel. The rotor is configured to rotate with the turbine wheel. The flow-through electric generator is configured to generate electrical power upon rotation of the rotor within the stator. The outlet pipe is coupled to the outlet of the turbine wheel. The outlet pipe is connected to a carbon dioxide pipeline network. The outlet pipe is configured to receive the carbon dioxide that has expanded through the flow-through electric generator.

This, and other aspects, can include one or more of the following features. The inlet pipe can include an inlet flow line and a first flow line. The inlet flow line can be configured to receive the carbon dioxide from the carbon dioxide pipeline. The first flow line can be coupled to the inlet flow line to receive at least a first portion of the carbon dioxide from the inlet flow line. The pressure control valve and the flow-through electric generator can be coupled to the first flow line. The inlet pipe can include a second flow line. The second flow line can be coupled to the inlet flow line to receive at least a second portion of the carbon dioxide from the inlet flow line and provide an alternate flow path for the carbon dioxide around the first flow line. The first flow line and the second flow line can be coupled downstream of the flow-through electric generator to recombine the first portion and the second portion of the carbon dioxide from the first flow line and the second flow line, respectively. The system can include a second pressure control valve. The second pressure control valve can be coupled to the second flow line. The second pressure control valve can be configured to provide a constriction of an adjustable size for the second portion of the carbon dioxide flowing in the second flow line to cause the second portion of the carbon dioxide to expand adiabatically across the second pressure control valve. A first outlet pressure of the first portion of the carbon dioxide exiting the flow-through electric generator can be substantially equal to a second outlet pressure of the second portion of the carbon dioxide exiting the second pressure control valve. The system can include a heater. The heater can be coupled to the inlet flow line. The heater can be configured to heat the carbon dioxide to a specified temperature upstream of the first flow line and the second flow line. The carbon dioxide at the specified pressure and the specified temperature can be in the gaseous state. The system can include a controller. The controller can be communicatively coupled to the second pressure control valve and the flow-through electric generator. The controller can be configured to adjust the size of the constriction provided by the second pressure control valve, thereby adjusting torque applied to the flow-through electric generator, such that the first outlet pressure of the first portion of the carbon dioxide exiting the flow-through electric generator can remain substantially equal to the second outlet pressure of the second portion of the carbon dioxide exiting the second pressure control valve. The flow-through electric generator can include a hermetically sealed housing enclosing the turbine wheel. The rotor and the stator can be hermetically sealed inline in the first flow line, such that the first portion of the carbon dioxide flows across the turbine wheel and the stator. The rotor can include a permanent magnet rotor.

Certain aspects of the subject matter described can be implemented as a method. An inlet pipe receives carbon dioxide from a carbon dioxide pipeline. The inlet pipe flows the carbon dioxide to a turbine wheel of a flow-through electric generator. Prior to flowing the carbon dioxide to the turbine wheel of the flow-through electric generator, a pressure of the carbon dioxide is reduced, such that the carbon dioxide entering the flow-through electric generator is in a gaseous state. The flow-through electric generator generates electrical power in response to the carbon dioxide flowing across the turbine wheel. After generating the electrical power, the carbon dioxide is flowed from the flow-through electric generator to an outlet pipe that is connected to a carbon dioxide pipeline network.

This, and other aspects, can include one or more of the following features. The inlet pipe can include an inlet flow line. The method can include flowing at least a first portion of the carbon dioxide from the inlet flow line to a first flow line of the inlet pipe. The flow-through electric generator can be coupled to the first flow line. The method can include flowing at least a second portion of the carbon dioxide from the inlet flow line to a second flow line of the inlet pipe. The second flow line can provide an alternate flow path for the carbon dioxide around the first flow line. The method can include recombining the first portion of the carbon dioxide from the first flow line with the second portion of the carbon dioxide from the second flow line, downstream of the flow-through electric generator. A pressure control valve can be coupled to the second flow line. The pressure control valve can provide a constriction of an adjustable size for the second portion of the carbon dioxide flowing in the second flow line to cause the second portion of the carbon dioxide to expand adiabatically across the pressure control valve. A first outlet pressure of the first portion of the carbon dioxide exiting the flow-through electric generator can be substantially equal to a second outlet pressure of the second portion of the carbon dioxide exiting the pressure control valve. A heater can be coupled to the inlet flow line. The heater can heat the carbon dioxide to a specified temperature upstream of the first flow line and the second flow line. The carbon dioxide at the specified pressure and the specified temperature can be in the gaseous state. The size of the constriction provided by the pressure control valve can be adjusted, thereby adjusting torque applied to the flow-through electric generator, such that the first outlet pressure of the first portion of the carbon dioxide exiting the flow-through electric generator can remain substantially equal to the second outlet pressure of the second portion of the carbon dioxide exiting the pressure control valve. The flow-through electric generator can include a hermetically sealed housing. The hermetically sealed housing can enclose the turbine wheel. The rotor and the stator can be hermetically sealed inline in the first flow line, such that the first portion of the carbon dioxide flows across the turbine wheel and the stator.

Certain aspects of the subject matter described can be implemented as a system. The system includes an inlet pipe, a first pressure control valve, a flow-through electric generator, and a second pressure control valve. The inlet pipe is connected to a carbon dioxide pipeline that flows carbon dioxide. The inlet pipe includes an inlet flow line, a first flow line, a second flow line, and an outlet flow line. The inlet flow line is configured to receive the carbon dioxide (for example, from the carbon dioxide pipeline). The first flow line is coupled to the inlet flow line to receive at least a first portion of the carbon dioxide from the inlet flow line. The second flow line is coupled to the inlet flow line to receive at least a second portion of the carbon dioxide from the inlet flow line and provide an alternate flow path for the carbon dioxide around the first flow line. The outlet flow line is coupled to the first flow line and the second flow line to recombine the first portion and the second portion of the carbon dioxide from the first flow line and the second flow line, respectively. The first pressure control valve is coupled to the first flow line. The first pressure control valve is configured to reduce a pressure of the first portion of the carbon dioxide to a specified pressure. The first portion of the carbon dioxide at the specified pressure is in a gaseous state. The flow-through electric generator is coupled to the first flow line. The flow-through electric generator includes a turbine wheel, a rotor, and a stator. The turbine wheel is configured to receive the first portion of the carbon dioxide from the first flow line. The turbine wheel is configured to rotate in response to expansion of the first portion of the carbon dioxide flowing into an inlet of the turbine wheel and out of an outlet of the turbine wheel. The rotor is coupled to the turbine wheel. The rotor is configured to rotate with the turbine wheel. The flow-through electric generator is configured to generate electrical power upon rotation of the rotor within the stator. The second pressure control valve is coupled to the second flow line. The second pressure control valve is configured to provide a constriction of an adjustable size for the second portion of the carbon dioxide flowing in the second flow line to cause the second portion of the carbon dioxide to expand adiabatically across the second pressure control valve. A first outlet pressure of the first portion of the carbon dioxide exiting the flow-through electric generator is substantially equal to a second outlet pressure of the second portion of the carbon dioxide exiting the second pressure control valve. The outlet flow line is connected to a carbon dioxide pipeline network. The outlet flow line is configured to receive the carbon dioxide that has expanded through the flow-through electric generator.

This, and other aspects, can include one or more of the following features. The system can include a heater. The heater can be coupled to the inlet flow line. The heater can be configured to heat the carbon dioxide to a specified temperature upstream of the first flow line and the second flow line. The carbon dioxide at the specified pressure and the specified temperature can be in the gaseous state. The system can include a controller. The controller can be communicatively coupled to the second pressure control valve and the flow-through electric generator. The controller can be configured to adjust the size of the constriction provided by the second pressure control valve, thereby adjusting torque applied to the flow-through electric generator, such that the first outlet pressure of the first portion of the carbon dioxide exiting the flow-through electric generator can remain substantially equal to the second outlet pressure of the second portion of the carbon dioxide exiting the second pressure control valve.

The details of one or more implementations of the subject matter of this disclosure are set forth in the accompanying drawings and the description. Other features, aspects, and advantages of the subject matter will become apparent from the description, the drawings, and the claims.

DETAILED DESCRIPTION

Natural gas, hydrogen, carbon dioxide, and other process gases are pressurized to facilitate efficient transportation in pipelines. To deliver the gas safely through local distribution networks, the process gas is depressurized to lower levels (often using pressure regulators). The pressure is stepped down at pressure letdown (PLD) stations for delivery to industrial, commercial, and residential end users. The PLD stations use regulating valves to achieve the required pressure drop, but also waste significant amounts of energy in the process. A turboexpander generator can be installed in parallel to the regulating valve to recover the wasted energy from pressure reduction and produce electrical power. By recovering lost energy from carbon dioxide pressure letdown applications, the turboexpander can generate electricity while also reducing $CO_2$ emissions, increasing overall plant efficiency, offsetting electrical costs, and generating additional revenue.

Figure 1:
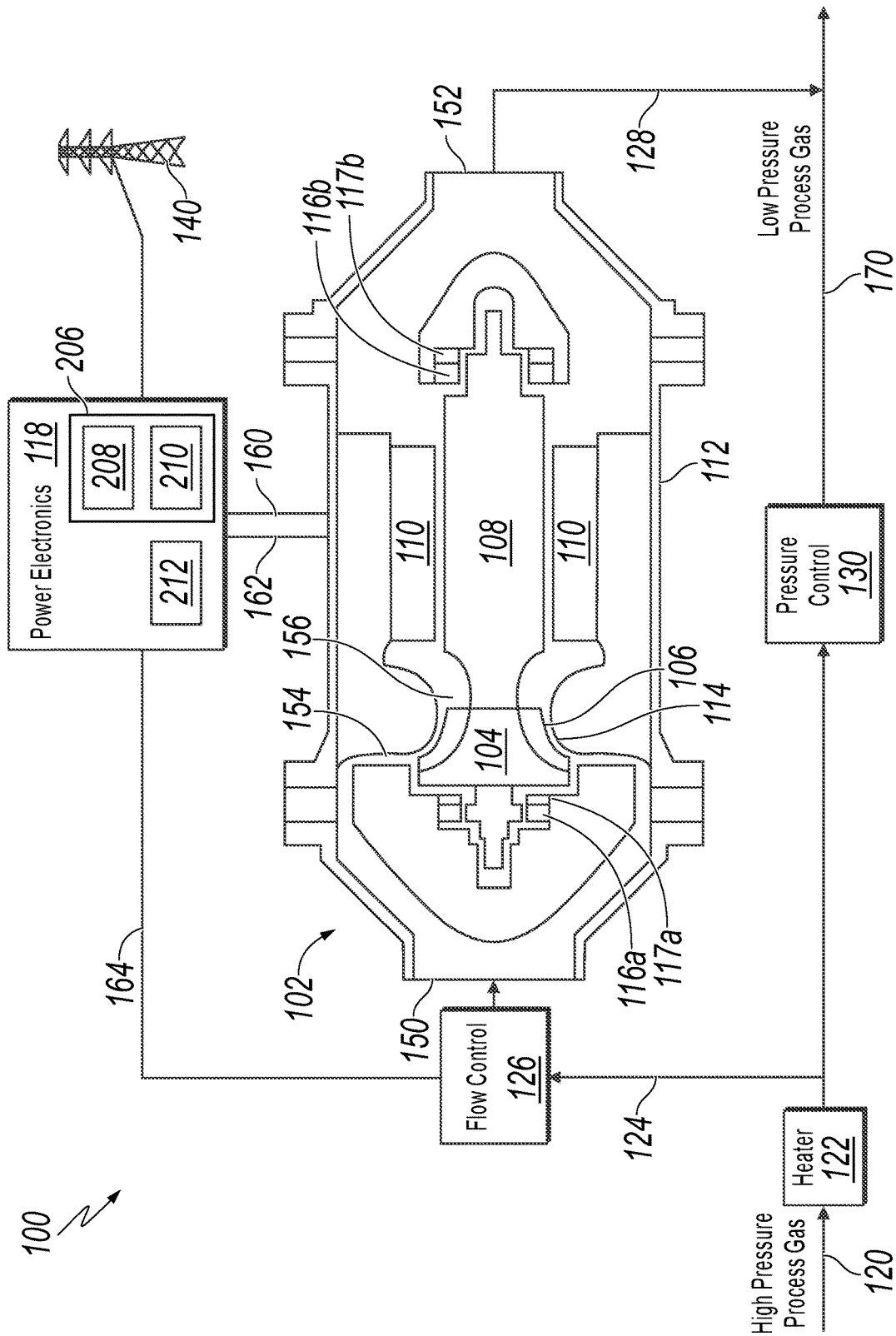
FIG. 1 is a schematic diagram of an example electrical power generation system including a turboexpander.

FIG. 1 is a schematic diagram of an electrical power generation system 100. The electrical power generation system 100 can be added at a PLD station to capture energy from gas expansion from the PLD process. The electrical power generation system 100 includes a turboexpander 102 in parallel with a pressure control valve 130. The turboexpander 102 is arranged axially so that the turboexpander 102 can be mounted in-line with a pipe. The turboexpander 102 acts as an electric generator by generating electrical energy from rotational kinetic energy derived from expansion of a process fluid 120 (e.g., carbon dioxide flowing in the carbon dioxide pipeline) through a turbine wheel 104. For example, rotation of the turbine wheel 104 can be used to rotate a rotor 108 within a stator 110, which then generates electrical power.

The turboexpander 102 includes a high-performance, high-speed permanent magnet generator with an integrated radial in-flow expansion turbine wheel 104 and low loss active magnetic bearings (AMBs) 116a,b. The rotor assembly consists of the permanent magnet section with the turbine wheel 104 mounted directly to the rotor hub. The rotor 108 is levitated by the magnetic bearing system creating a frictionless (or near frictionless) interface between dynamic and static components. The AMBs 116a,b facilitate a lossless (or near lossless) rotation of the rotor 108.

The turboexpander 102 is designed to have the process fluid 120 flow through the system 100, which cools the generator and eliminates the need for auxiliary cooling equipment. The power electronics 118 for the turboexpander 102 combines a power converter 206 and Magnetic Bearing Controller (MBC) 212 into one cabinet, in some implementations. The power converter 206 allows for consistent delivery of generated power from the turboexpander 102. For example, the power converter 206 regulates the frequency and voltage of the generated current to match a local power grid. As another example, the power converter 206 regulates the frequency and voltage of the generated current to be compatible for use by a power user, such as an electrolysis unit. After expansion, the process fluid 120 exits the turboexpander 102 along the same axial path for downstream processes.

The turboexpander 102 includes a flow-through configuration. The flow-through configuration permits the process fluid 120 to flow from an inlet side of the turboexpander 102 to an outlet side of the turboexpander 102. The process fluid 120 flows into a radial gas inlet 154 to the turbine wheel 104 and out of the turbine wheel 104 from an axial gas outlet 156. The process fluid 120 then flows through the generator and out of the outlet 154, where the process fluid 120 rejoins the gas pipeline 170. Generally, high pressure process fluid 120 is directed to flow into the turboexpander 102 through a flow control system 126. The flow control system 126 includes a flow or mass control valve and an emergency shut off valve. Flow control system 126 can be controlled by power electronics 118 or other electrical, mechanical, or electromagnetic signal. For example, a fault condition can signal the flow control system 126 to close or partially close, thereby removing or restricting gas supply to the turboexpander 102. When the rotor 108 is operating at a constant speed, restricting or removing gas flow to the turboexpander 102 reduces the torque applied to the rotor 108 and, consequently, reduces the amount of current generated by the power converter 206. In the example shown in FIG. 1, a signal channel 164 from the power electronics 118 can be used to open and/or close the flow control system 126. In some implementations, the turboexpander housing 112 is hermetically sealed.

The process fluid 120 is expanded by flowing across the turbine wheel 104, resulting in a pressure letdown of the process fluid 120. The process fluid 120 exits the turboexpander 102 at a decreased pressure. The expansion of the process fluid 120 across the turbine wheel 104 causes the turbine wheel 104 to rotate, which causes the rotor 108 to rotate. The rotation of the rotor 108 within the stator 110 generates electrical power. The turboexpander 102 achieves the desired pressure letdown and captures the energy from the pressure letdown to generate electrical power. A pressure control valve 130, such as a conventional pressure regulator, can be installed in parallel to the turboexpander 102. Any excess high pressure process fluid 120 that is not directed into the turboexpander 102 can be directed through the pressure control valve 130. For example, the pressure control valve 130 is configured to provide a constriction of an adjustable size for the portion of the process fluid 120 flowing through the pressure control valve 130 to expand adiabatically across the pressure control valve 130. The pressure of the portion of the process fluid 120 exiting the pressure control valve 130 equalizes with the pressure of the portion of the process fluid 120 exiting the turboexpander 102. As such, the pressure control valve 130 and the flow control system 126 can work together to control the pressure of the process fluid 120 that flows through the turboexpander and, in turn, control the amount of current generated by the power converter 206.

In some implementations, a heater 122 can heat the process fluid 120 prior to flowing the process fluid 120 into the turboexpander 102. For example, if the expansion of the process fluid 120 through the turbine wheel 104 lowers the temperature of the process fluid 120 to a point where moisture in the process fluid 120 freezes at the turbine wheel 104 or another downstream location, the process fluid 120 can be heated by heater 122 prior to entering the turboexpander 102. After heating, the process fluid 120 can then be directed into the turboexpander 102. The heating of the process fluid 120 can prevent freezing moisture as the process fluid 120 expands and its temperature drops. The heater 122 and the flow control system 126 can be cooperatively configured to adjust the operating conditions of the process fluid 120 entering the turboexpander 102. For example, the heater 122 and the flow control system 126 are cooperatively configured to adjust the operating temperature and the operating pressure of the process fluid 120 upstream of the turboexpander 102, such that the process fluid 120 enters the turboexpander 102 in a gaseous state. For example, if the process fluid 120 is in a liquid or supercritical state, the heater 122 and the flow control system 126 can be cooperatively configured to increase the operating temperature, decrease the operating pressure, or both to change the state of the process fluid 120 to a gaseous state prior to the process fluid 120 entering the turboexpander 102.

The turboexpander 102 includes a turbine wheel 104. The turbine wheel 104 is shown as a radial inflow turbine wheel, though other configurations are within the scope of this disclosure, such as axial flow turbine wheels. In this example, the process fluid 120 is received from an inlet conduit 150 of the housing 112 enters a radially oriented inlet 154 of the turbine wheel 104. In some implementations, the process fluid 120 flows through an inlet conduit 150 and is diverted by a flow diverter to a radial inlet 154 that directs the fluid into the radial inflow of the turbine wheel 104. After expanding, the process fluid 120 exits the turbine wheel 104 from an axially oriented outlet 156 to outlet conduit 152 of the housing 112.

The turbine wheel 104 can be directly affixed to the rotor 108, or to an intermediate common shaft, for example, by fasteners, rigid drive shaft, welding, or other manner. For example, the turbine wheel 104 may be received at an end of the rotor 108, and held to the rotor 108 with a shaft. The shaft threads into the rotor 108 at one end, and at the other, captures the turbine wheel 104 between the end of rotor 108 and a nut threadingly received on the shaft. The turbine wheel 104 and rotor 108 can be coupled without a gearbox and rotate at the same speed. In other instances, the turbine wheel 104 can be indirectly coupled to the rotor 108, for example, by a gear train, clutch mechanism, or other manner.

The turbine wheel 104 includes a plurality of turbine wheel blades 106 extending outwardly from a hub and that interact with the expanding process fluid 120 to cause the turbine wheel 104 to rotate. FIG. 1 shows an unshrouded turbine wheel 104, in which each of the turbine blades 106 has an exposed, generally radially oriented blade tip extending between the radial inlet 154 and axial outlet 156. As discussed in more detail below, the blade tips substantially seal against a shroud 114 on the interior of the housing 112. In certain instances, the turbine wheel 104 is a shrouded turbine wheel.

In configurations with an un-shrouded turbine wheel 104, the housing 112 includes an inwardly oriented shroud 114 that resides closely adjacent to, and at most times during operation, out of contact with the turbine wheel blades 106. The close proximity of the turbine wheel blades 106 and shroud 114 substantially seals against passage of process fluid 120 therebetween, as the process fluid 120 flows through the turbine wheel 104. Although some amount of the process fluid 120 may leak or pass between the turbine wheel blades 106 and the shroud 114, the leakage is insubstantial in the operation of the turbine wheel 104. In certain instances, the leakage can be commensurate with other similar unshrouded-turbine/shroud-surface interfaces, using conventional tolerances between the turbine wheel blades 106 and the shroud 114. The amount of leakage that is considered acceptable leakage may be predetermined. The operational parameters of the turbine generator may be optimized to reduce the leakage. In some implementations, the housing 112 is hermetically sealed to prevent process fluid 120 from escaping the radial inlet 154 of the turbine wheel 104.

The shroud 114 may reside at a specified distance away from the turbine wheel blades 106, and is maintained at a distance away from the turbine wheel blades 106 during operation of the turboexpander 102 by using magnetic positioning devices, including active magnetic bearings and position sensors.

Bearings 116a and 116b are arranged to rotatably support the rotor 108 and turbine wheel 104 relative to the stator 110 and the shroud 114. The turbine wheel 104 is supported in a cantilevered manner by the bearings 116a and 116b. In some implementations, the turbine wheel 104 may be supported in a non-cantilevered manner and bearings 116a and 116b may be located on the outlet side of turbine wheel 104. In certain instances, one or more of the bearings 116a or 116b can include ball bearings, needle bearings, magnetic bearings, foil bearings, journal bearings, or others.

Bearings 116a and 116b may be a combination radial and thrust bearing, supporting the rotor 108 in radial and axial directions. Other configurations could be utilized. The bearings 116a and 116b need not be the same types of bearings.

In implementations in which the bearings 116a and 116b are magnetic bearings, a magnetic bearing controller (MBC) 212 is used to control the magnetic bearings 116a and 116b. Position sensors 117a, 117b can be used to detect the position or changes in the position of the turbine wheel 104 and/or rotor 108 relative to the housing 112 or other reference point (such as a predetermined value). Position sensors 117a, 117b can detect axial and/or radial displacement. The magnetic bearing 116a and/or 116b can respond to the information from the position sensors 117a, 117b and adjust for the detected displacement, if necessary. The MBC 212 may receive information from the position sensor(s) 117a, 117b and process that information to provide control signals to the magnetic bearings 116a, 116b. MBC 212 can communicate with the various components of the turboexpander 102 across a communications channel 162.

The use of magnetic bearings 116a, 116b and position sensors 117a, 117b to maintain and/or adjust the position of the turbine wheel blades 106 such that the turbine wheel blades 106 stay in close proximity to the shroud 114 permits the turboexpander 102 to operate without the need for seals (e.g., without the need for dynamic seals). The use of the active magnetic bearings 116a,b in the turboexpander 102 eliminates physical contact between rotating and stationary components, as well as eliminate lubrication, lubrication systems, and seals.

The turboexpander 102 may include one or more backup bearings. For example, at start-up and shut-down or in the event of a power outage that affects the operation of the magnetic bearings 116a and 116b, bearings may be used to rotatably support the turbine wheel 104 during that period of time. The backup bearings and may include ball bearings, needle bearings, journal bearings, or the like.

As mentioned previously, the turboexpander 102 is configured to generate electrical power in response to the rotation of the rotor 108. In certain instances, the rotor 108 can include one or more permanent magnets. The stator 110 includes a plurality of conductive coils. Electrical power is generated by the rotation of the magnet within the coils of the stator 110. The rotor 108 and stator 110 can be configured as a synchronous, permanent magnet, multiphase alternating current (AC) generator. The electrical output 160 can be a three-phase output, for example. In certain instances, stator 110 may include a plurality of coils (e.g., three or six coils for a three-phase AC output). When the rotor 108 is rotated, a voltage is induced in the stator 110. At any instant, the magnitude of the voltage induced in stator coils is proportional to the rate at which the magnetic field encircled by the coil is changing with time (i.e., the rate at which the magnetic field is passing the two sides of the coil). In instances where the rotor 108 is coupled to rotate at the same speed as the turbine wheel 104, the turboexpander 102 is configured to generate electrical power at that speed. Such a turboexpander 102 is what is referred to as a "high speed" turbine generator. For example, the turboexpander 102 can produce up to 280 kW at a continuous speed of 30,000 rpm. In some implementations, the turboexpander produces on the order of 350 kW at higher rotational speeds (e.g., on the order of 35,000 rpm). As another example, the turboexpander 102 can produce about 355 KW at a continuous speed of about 9,500 rpm.

In some implementations, the design of the turbine wheel 104, rotor 108, and/or stator 110 can be based on a desired parameter of the output gas from the turboexpander 102. For example, the design of the rotor and stator can be based on a desired temperature of the process fluid 120 exiting the turboexpander 102.

The turboexpander 102 can be coupled to a power electronics 118. Power electronics 118 can include a power converter 206 and the magnetic bearing controller (MBC) 212 (discussed above). The power converter 206 can be, for example, a variable speed drive (VSD) or a variable frequency drive.

The electrical output 160 of the turboexpander 102 is connected to the power converter 206, which can be programmed to specific power requirements. The power converter 206 can include an insulated-gate bipolar transistor (IGBT) rectifier 208 to convert the variable frequency, high voltage output from the turboexpander 102 to a direct current (DC). The rectifier 208 can be a three-phase rectifier for three-phase AC input current. An inverter 210 then converts the DC from the rectifier 208 to AC for supplying to the power grid 140. The inverter 210 can convert the DC to 380 VAC-480 VAC at 50 to 60 Hz for delivery to the power grid 140. The specific output of the power converter 206 depends on the power grid 140 and application. Other conversion values are within the scope of this disclosure. The power converter 206 matches its output to the power grid 140 by sampling the grid voltage and frequency, and then changing the output voltage and frequency of the inverter 210 to match the sampled power grid voltage and frequency.

In some implementations, the power converter 206 is a bidirectional power converter. In such implementations, the rectifier 208 can receive an alternating current from the power grid 140 and convert the alternating current into a direct current. The inverter 210 can then convert DC from the rectifier 208 to AC for supplying to the generator. In such implementations, power can be delivered from the power grid 140 to the generator to drive rotation of the rotor 108, and in turn, the turbine wheel 104 to induce flow of a process gas. In sum, in implementations in which the power converter 206 is a bidirectional power converter, the flow of power can be reversed and used by the generator to induce flow of a process gas (as opposed to the process gas contributing expansion work to generate power).

The turboexpander 102 is also connected to the MBC 212 in the power electronics 118. The MBC 212 constantly monitors position, current, temperature, and other parameters to ensure that the turboexpander 102 and the active magnetic bearings 116a and 116b are operating as desired. For example, the MBC 212 is coupled to position sensors 117a, 117b to monitor radial and axial position of the turbine wheel 104 and the rotor 108. The MBC 212 can control the magnetic bearings 116a, 116b to selectively change the stiffness and damping characteristics of the magnetic bearings 116a, 116b as a function of spin speed. The MBC 212 can also control synchronous cancellation, including automatic balancing control, adaptive vibration control, adaptive vibration rejection, and unbalance force rejection control.

Figure 2:
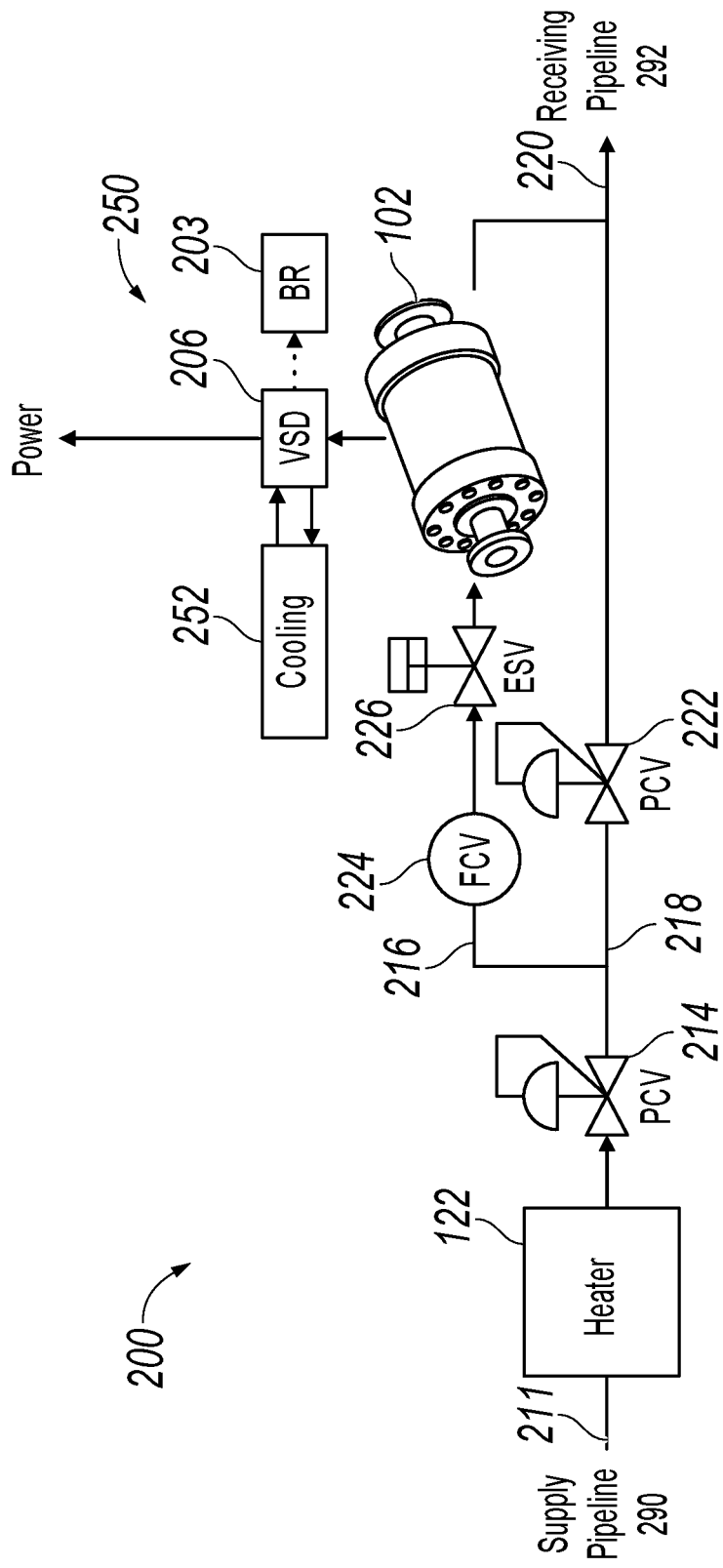
FIG. 2 is a schematic diagram of an example turboexpander system connected to a carbon dioxide flowing pipeline.

FIG. 2 is a schematic diagram of an example turboexpander system 200 connected to a pipeline 290 flowing a process fluid 120, such as carbon dioxide. Turboexpander system 200 includes the turboexpander 102 and the power electronics 118 of system 100 (described previously and shown in FIG. 1), for recovering energy from reducing the pressure of process fluid 120 flowing in the pipeline 290. In certain instances, the system 200 resides between interconnected pipelines (such as the pipeline 290 and a receiving pipeline 292). In certain instances, the system 200 resides on or off a gas processing site that processes the process fluid 120. The turboexpander 102 and the heater 122 are located at the same physical site. In some embodiments, the turboexpander 102 and the heater 122 are located within 10 meters, within 50 meters, within 100 meters, or within 500 meters of one another.

In some implementations, the process fluid 120 is predominantly carbon dioxide. For example, the process fluid 120 includes at least 96 molar percent (mol. %) of carbon dioxide. For example, the process fluid 120 has a carbon dioxide content in a range of from about 96 mol. % to about 99.999 mol. %, from about 97 mol. %, to about 99.999 mol. %, from about 98 mol. % to about 99.999 mol. %, from about 99 mol. % to about 99.999 mol. %, from about 99.9 mol. % to about 99.999 mol. %, or from about 99.99 mol. % to about 99.999 mol. %. The process fluid 120 can include one or more contaminants. For example, the process fluid 120 may include small amounts of carbon monoxide, hydrogen, hydrogen sulfide, sulfur content, nitrogen oxide content, oxygen, water, a hydrocarbon, glycol, a non-condensable gas, or any combination of these. For example, the process fluid 120 may include at most about 0.4 mol. % of carbon monoxide (CO). For example, the process fluid 120 may include at most about 0.5 mol. % of hydrogen ($H_2$). For example, the process fluid 120 may include at most about 20 parts per million (ppm) of hydrogen sulfide ($H_2S$). For example, the process fluid 120 may include at most about 35 ppm of sulfur content (that is, compounds including at least one sulfur atom, such as hydrogen sulfide). For example, the process fluid 120 may include at most about 10 ppm (by weight) of oxygen ($O_2$). For example, the process fluid 120 may include at most about 150 ppm of water ($H_2O$). For example, the process fluid 120 may include at most about 4 mol. % of one or more hydrocarbons (such as methane). For example, the process fluid 120 may include at most about 0.3 gallons per million cubic feet (gal/MMCF) of glycol. For example, the process fluid 120 may include at most about 3 mol. % of non-condensable gases. In some implementations, the process fluid 120 has a maximum dew point of about 30 degrees Fahrenheit (° F.) at 400 pounds per square inch gauge (psig).

In certain instances, the electric power generation system 250 is the same as the electric power generation system 100. With reference to FIGS. 1 and 2, the system 250 includes, among other things of system 100, the above described turboexpander 102 in a hermetic housing 112, the electrical output of the generator of the turboexpander 102 being coupled to power electronics 118, including a VSD 206 with, in some instances, a brake resistor assembly 203. In cases in which a brake resistor assembly 203 is included, the brake resistor assembly 203 is electrically connected to the electrical output of the turboexpander 102 (e.g., the output of the generator via the VSD 206). The brake resistor assembly 203 can have a tuned impedance to allow an efficient transfer of power from the turboexpander 102 to the brake resistor assembly 203. In some embodiments, a contactor can connect the output current of the turboexpander 102 to the brake resistor assembly 203 when there is a fault condition at the VSD 206. The contactor is an electrically controlled switch for switching in an electrical power circuit. The contactor can accommodate the three-phase current output from the generator to direct the current to the brake resistor assembly 203. In some embodiments, the contactor is connected directly to the (three-phase) electrical output of the turboexpander 102. In some embodiments, the brake resistor assembly 203 and/or the contactor are not part of the power electronics, but are connected to the electrical output of the turboexpander 102 outside of the power electronics 118. The VSD 206 can provide an energizing signal to the coil of the contactor to cause the contactor to connect the electrical output of the turboexpander to the brake resistor assembly 203. Depending on the implementation choice, the contactor can be a normally closed (NC) contactor or a normally open (NO) contactor.

The turboexpander 102 can be configured to handle the gas conditions supplied by the pipeline 290, for example, configured to handle supercritical fluid and/or a specified amount of liquid in the gas. In certain instances, the VSD 206 can be coupled to a cooling system 252 to cool the electronics of the VSD 206 to maintain temperatures below a specified operating temperature. The output of the VSD 206 can be electrically coupled to a load, such as a power grid to supply power to the grid, as described above, a microgrid at a gas processing site 213 for supplying power to equipment used for processing the carbon dioxide at the gas processing site 213, and/or directly to one or more pieces of equipment used for processing the carbon dioxide at the gas processing site 213 to supply power to the equipment. In certain instances, the equipment includes flow, pressure, temperature, and level sensors of various equipment, valve actuators, communications equipment for allowing remote communication with the sensors, other equipment and control of the valve actuators, separators (e.g., sand separators, liquid separators), heater treaters, site lighting, control trailers and/or other types of equipment. In certain instances, the electricity produced by the electric power generation system 250 can be used by other equipment at the gas processing site 213 not involved in processing the carbon dioxide.

The system 200 includes a flow line 211 flowing carbon dioxide from the pipeline 290. The flow line 211 includes flow conditioning equipment to condition the flow to specified conditions selected based on the specification of pipeline 290, as well as based on the characteristics of the turboexpander 102 of the electric power generation system 250. In FIG. 2 the conditioning equipment is shown as the heater 122 and the pressure control valve 214, but the conditioning equipment could include additional, different or fewer pieces and types of equipment (for example, a separator). Turning back to the specific example of FIG. 2, flow in flow line 211 flows to a pressure control valve 214. The pressure control valve 214 can be controlled to reduce the pressure of the gas flow to a specified pressure. Each of the valves herein, whether control or isolation or other, can be remote controlled, e.g., via an operator at a remote control board on the injection site 213 or elsewhere or both, and/or autonomously controlled by a control algorithm of a controller residing at the gas processing site 213 or elsewhere or both.

Flow from the pressure control valve 214 is split into a first downstream flow line 216 that includes an electric power generation system 250, including a turboexpander 102, and a second downstream flow line 218 that bypasses the turboexpander 102. The first downstream flow line 216 and second downstream flow line 218 recombine upstream of the receiving pipeline 292. The inlet of the hermetic housing 112 is hermetically coupled in-line with first flow line 216 so that all fluid in the flow line 216 is directed into the hermetic housing 112, flows through the housing 112, and back into the remainder of first flow line 216.

The second flow line 218 includes a pressure control valve 222 (e.g., pressure control valve 130) configured with a specified pressure drop to actuation position correlation. The pressure control valve 222 can be controlled to regulate the pressure in the second flow line 218 downstream of the valve 222, and in turn (as a function of the pressure of the flow coming from the supply pipeline 290) the pressure upstream of the pressure control valve 222 and the pressure in the first flow line 216. The first flow line 216 includes a flow control valve 224 (e.g., flow control valve 126), configured with a specified flow rate to actuation position correlation. The flow control valve 224 can be controlled in relation to the pressure control valves 214, 222 to control the flow rate of fluid flowing through the first flow line 216, and thus the flow rate of flowing through the turboexpander 102.

This arrangement provides the turboexpander 102 in parallel to the second flow line 218, and as will be discussed in more detail below, allows freedom in sizing the turboexpander 102 relative to the conditions of the supply pipeline 290 and/or the receiving pipeline 292. The freedom stems, in part, from the second flow line 218 allowing flow to selectively bypass the turboexpander 102 in flowing from the supply pipeline 290 to the receiving pipeline 292. In short, however, all flow need not pass through the turboexpander 102 in flowing from the supply pipeline 290 to the receiving pipeline 292, so the turboexpander 102 need not be sized to receive all of the flow. The first flow line 216 also includes an emergency shut-off valve 226 upstream of the turboexpander 102 to quickly shut off flow to the turboexpander 102, if needed. When closed, the entirety of the flow flows through the second flow line 218. Notably, although not shown, the inlet flow line 211, first flow line 216 and second flow line 218 can additionally be instrumented with sensors to monitor the pressure, temperature, flow rate, and/or other characteristics of the flow in each line and upstream and/or downstream of each component (e.g., valves, turboexpander and other components in the flow lines).

Pressure of the carbon dioxide is regulated with the pressure control valve 214 in the flow line 211 to a specified pressure. The pressure control valve 222 in the second flow line 218 is, in turn, controlled to maintain the pressure through the first flow line 216 and through the turboexpander 102 so that together with the flow control valve 224 the conditions through the turboexpander 102 are maintained within the turboexpander's specified operating range. Excess flow exits the second flow line 218 and is directed to the outlet flow line 220 which is connected to the receiving pipeline 292. The flow through the first flow line 216 flows through the turboexpander 102, generating power, and then back to recombine with the flow from the second flow line 218 in the outlet flow line 220 and on to the receiving pipeline 292.

The characteristics of the turboexpander 102 are selected based on a number of factors, including the expected pressures, temperatures and flow rates that can be delivered via the pipeline 290, the timeframe during the life of the pipeline 290 and/or receiving pipeline 292 that power generated by the turboexpander 102 is desired or needed, the ambient conditions at the gas processing site 213, the conditions, including pressure, temperature and/or flow rate, specified for supply by the pipeline 290 (often specified by the pipeline operator), the conditions for receipt by the receiving pipeline 292, and the amount of electricity desired or needed to be produced at the gas processing site 213 by the turboexpander 102. The specified pressure to which the pressure control valve 214 is controlled is, in turn, selected based on a number of factors, including the pressure, temperature and flow characteristics of the turboexpander 102, the amount of electricity desired or needed to be produced, as well as the pressure, temperature and/or flow rate, specified for supply by the pipeline 290 and for receipt by the receiving pipeline 292. For example, in certain instances, the receiving pipeline 292 is configured to operate at a specified pressure. The turboexpander 102, which causes a pressure drop as it extracts energy from the flow, is configured to, in cooperation with the pressure control valves 214, 222 produce an outlet pressure out of the turboexpander 102 equal to the specified pressure of the receiving pipeline 292. In certain instances, the receiving pipeline 292 also has a specified minimum temperature, for example a temperature selected to prevent freezing of the fluids in the pipeline. The turboexpander 102, which causes a temperature drop as it extracts energy from the flow, is configured to, in cooperation with heater 122 and the pressure control valves 214, 222

(which also cause a temperature drop), maintain an outlet temperature of the turboexpander 102 and at the entrance to the interconnect pipeline 292 at the specified pressure at or above the specified minimum temperature. The turboexpander 102, which can be optimized to operate at peak efficiency under the pressure, temperature and flow conditions offered by the pipeline 290, operates to generate electricity, while also providing and maintaining a further pressure drop downstream of the turboexpander 102 to the specified pressure of the receiving pipeline 292. In certain instances, the turboexpander 102 is configured to produce usable amounts of electricity until the pressure upstream approaches the receiving pipeline 292's specified pressure.

In some implementations, the specified temperature of the carbon dioxide flowing through the supply pipeline 290 is in a range of from about 40° F. to about 50° F. In some implementations, the specified pressure of the carbon dioxide flowing through the supply pipeline 290 is in a range of from about 1,000 psig to about 1,500 psig. The specified operating conditions of the pipeline 290 in some cases can at least partially depend on the flow rate of the process fluid 120 flowing through the pipeline 290. For example, the supply pipeline 290 is designed for a specified temperature of about 44° F. and a specified pressure of about 1,250 psig for a carbon dioxide flow rate of about 95 million standard cubic feet per day (MMSCFD). For example, the supply pipeline 290 is designed for a specified temperature of about 46° F. and a specified pressure of about 1,250 psig for a carbon dioxide flow rate of about 134 MMSCFD. In some implementations, the heater 122 and/or the pressure control valves 214, 222 cooperate to adjust the operating conditions of the process fluid 120 flowing from the supply pipeline 290, such that the process fluid 120 entering the turboexpander 102 is in a gaseous state. For example, the heater 122 and/or the pressure control valves 214, 222 cooperate to adjust the temperature of the process fluid 120 entering the turboexpander 102 to be in a range of from about 140° F. to about 180° F. from about 140° F. to about 170° F., from about 140° F. to about 160° F., from about 150° F. to about 180° F., from about 150° F. to about 170° F., or from about 150° F. to about 160° F. For example, the heater 122 and/or the pressure control valves 214, 222 cooperate to adjust the pressure of the process fluid 120 entering the turboexpander 102 to be in a range of from about 700 psig to about 1,200 psig, from about 700 psig to about 1,100 psig, from about 700 psig to about 1,000 psig, from about 700 psig to about 900 psig, from about 800 psig to about 1,200 psig, from about 800 psig to about 1,100 psig, from about 800 psig to about 1,000 psig, from about 800 psig to about 900 psig, from about 900 psig to about 1,200 psig, from about 900 psig to about 1,100 psig, from about 900 psig to about 1,000 psig, or from about 850 psig to about 950 psig. The specified operating conditions of the receiving pipeline 292 in some cases can at least partially depend on the flow rate of the process fluid 120 flowing through the receiving pipeline 292, the operating conditions of the process fluid 120 supplied by the pipeline 290, the flow rate through the turboexpander 102, the operating characteristics of the turboexpander 102, or any combinations of these. For example, the receiving pipeline 292 is designed for a specified temperature of about 100° F. and a specified pressure of about 460 psig for a carbon dioxide flow rate of about 95 MMSCFD. For example, the receiving pipeline 292 is designed for a specified temperature of about 100° F. and a specified pressure of about 530 psig for a carbon dioxide flow rate of about 134 MMSCFD.

The carbon dioxide expands as it flows through the turboexpander 102, which causes the turbine wheel 104 to rotate. The rotation of the turbine wheel 104 rotates the rotor 108 that supports a plurality of permanent magnets. The rotation of the permanent magnets on the rotor 108 induces a current through coils or windings on stator 110 to produce electrical power. In some embodiments, the power electronics 118 is configured to provide consistent delivery of generated power from the turboexpander 102, for example, to a power grid or a user.

Figure 3:
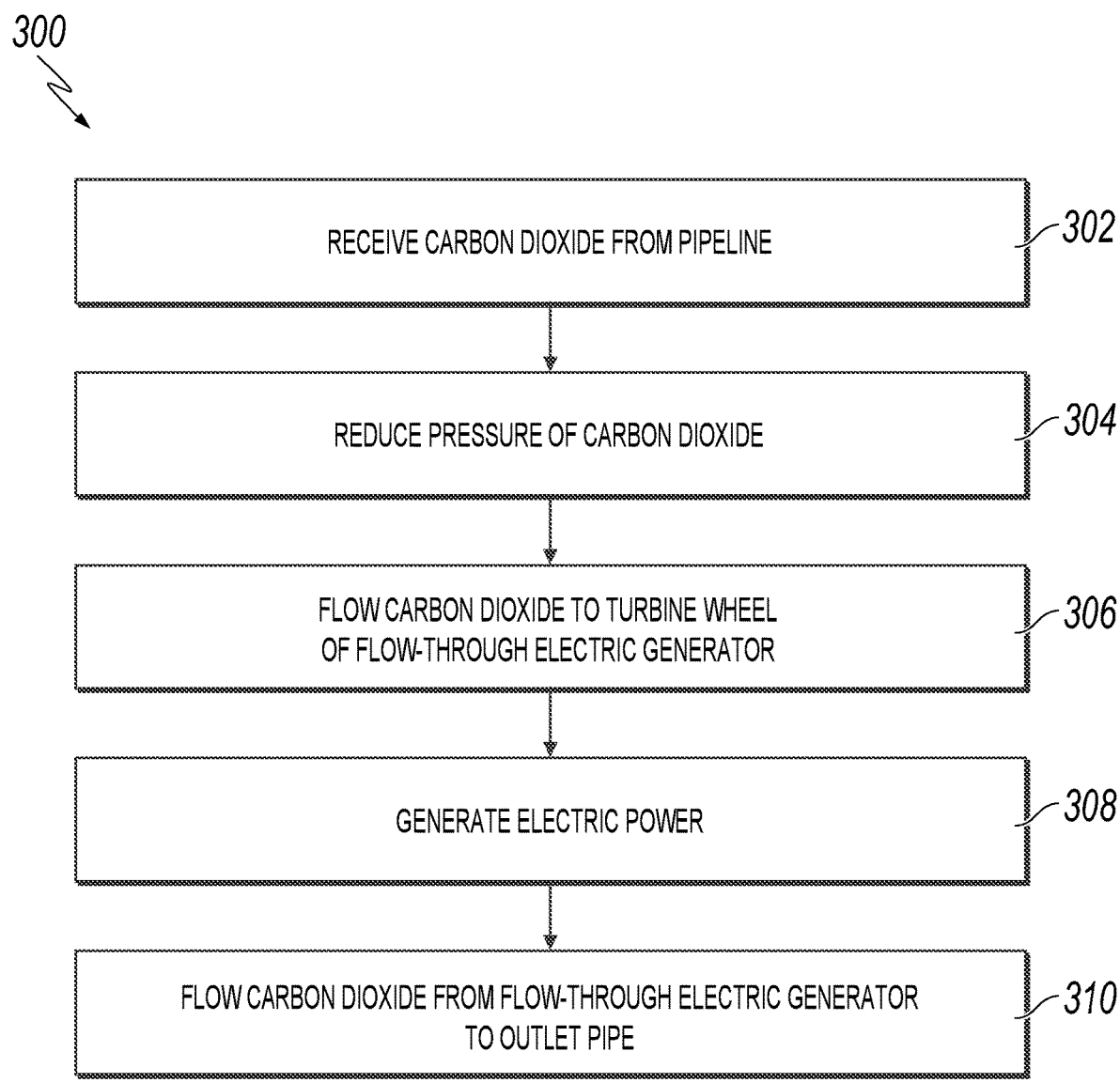
FIG. 3 is a flow chart of an example method for generating power from pressure letdown of carbon dioxide.

FIG. 3 is a flow chart of an example method 300 for generating power by carbon dioxide gas expansion work. The method 300 can be implemented, for example, by an implementation of the turboexpander system 200. At block 302, carbon dioxide (such as the process fluid 120) from a carbon dioxide pipeline (such as the supply pipeline 290) is received by an inlet pipe (such as the inlet flow line 211). At block 304, a pressure of the process fluid 120 (carbon dioxide) is reduced. In some implementations, the carbon dioxide is heated (for example, by the heater 122) prior to proceeding to block 306. At block 306, the process fluid 120 (carbon dioxide) is flowed by the inlet flow line 211 to a turbine wheel (such as the turbine wheel 104) of an electric generator (such as the turboexpander 102). Adjusting the operating conditions of the process fluid 120 (for example, by the heater 122 and block 304) ensures that the process fluid 120 entering the turboexpander 102 is in a gaseous state. At block 308, electrical power is generated by the turboexpander 102 in response to the carbon dioxide flowing across the turbine wheel 104. At block 310, the carbon dioxide is flowed from the turboexpander 102 to an outlet pipe (such as the outlet flow line 220) that is connected to a carbon dioxide pipeline network (such as the receiving pipeline 292).

As used in this disclosure, the term "substantially" refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The specification and drawings are, accordingly, to be regarded in an illustrative sense rather than a restrictive sense. Furthermore, the foregoing use of implementation and other exemplarily language does not necessarily refer to the same implementation or the same example, but may refer to different and distinct implementations, as well as potentially the same implementation. In the foregoing specification, a detailed description has been given with reference to specific exemplary implementations. It will, however, be evident that various modifications and changes may be made thereto without departing from the broader spirit and scope of the disclosure as set forth in the claims.

What is claimed is:
1. A system comprising:
an inlet pipe connected to a carbon dioxide pipeline flowing carbon dioxide;
a pressure control valve installed on the inlet pipe, the pressure control valve configured to reduce a pressure of the carbon dioxide to a specified pressure, wherein the carbon dioxide at the specified pressure is in a gaseous state;
a flow-through electric generator coupled to the inlet pipe downstream of the pressure control valve, the flow-through electric generator comprising:
a hermetically sealed housing;
a turbine wheel disposed within the hermetically sealed housing and configured to receive the carbon dioxide from the inlet pipe and rotate in response to expan- sion of the carbon dioxide flowing into a radial inlet of the turbine wheel and out of an outlet of the turbine wheel;
- a permanent magnet rotor disposed within the hermetically sealed housing and coupled to the turbine wheel and configured to rotate with the turbine wheel; and
- a stator disposed within the hermetically sealed housing and surrounding the permanent magnet rotor, wherein the flow-through electric generator is configured to generate electrical power upon rotation of the rotor within the stator, wherein the hermetically sealed housing is configured to prevent the carbon dioxide from escaping the radial inlet of the turbine wheel;
- an outlet pipe coupled to the outlet of the turbine wheel, the outlet pipe connected to a carbon dioxide pipeline network, the outlet pipe configured to receive the carbon dioxide that has expanded through the flow-through electric generator;
- a first flow line coupled to the inlet pipe to receive at least a first portion of the carbon dioxide from the inlet pipe, wherein the pressure control valve and the flow-through electric generator are coupled to the first flow line;
- a second flow line coupled to the inlet pipe to receive at least a second portion of the carbon dioxide from the inlet pipe and provide an alternate flow path for the carbon dioxide around the first flow line, wherein the first flow line and the second flow line are coupled downstream of the flow-through electric generator to recombine the first portion and the second portion of the carbon dioxide from the first flow line and the second flow line, respectively;
- a heater coupled to the inlet pipe, the heater configured to heat the carbon dioxide to a specified temperature upstream of the first flow line and the second flow line, wherein the carbon dioxide at the specified pressure and the specified temperature is in the gaseous state.

2. The system of claim 1, comprising a second pressure control valve coupled to the second flow line, the second pressure control valve configured to provide a constriction of an adjustable size for the second portion of the carbon dioxide flowing in the second flow line to cause the second portion of the carbon dioxide to expand adiabatically across the second pressure control valve.

3. The system of claim 2, comprising a controller communicatively coupled to the second pressure control valve and the flow-through electric generator, wherein the controller is configured to adjust the size of the constriction provided by the second pressure control valve, thereby adjusting torque applied to the flow-through electric generator.

4. The system of claim 3, wherein the flow-through electric generator comprises a hermetically sealed housing surrounding the turbine wheel, wherein the rotor and the stator are hermetically sealed inline in the first flow line, such that the first portion of the carbon dioxide flows across the turbine wheel and the stator.

5. A method comprising:
- receiving, by an inlet pipe, carbon dioxide from a carbon dioxide pipeline;
- flowing at least a first portion of the carbon dioxide from the inlet flow line to a first flow line, wherein the flow-through electric generator is coupled to the first flow line;
- flowing, by the first flow line, the first portion of the carbon dioxide to a radial inlet of a turbine wheel disposed within a hermetically sealed housing of a flow-through electric generator coupled to the first flow line, wherein the turbine wheel rotates in response to expansion of the first portion of the carbon dioxide flowing into the radial inlet of the turbine wheel and out of an outlet of the turbine wheel, wherein the hermetically sealed housing prevents the first portion of the carbon dioxide from escaping the radial inlet of the turbine wheel;
- prior to flowing the first portion of the carbon dioxide to the radial inlet of the turbine wheel of the flow-through electric generator, reducing a pressure of the first portion of the carbon dioxide to a specified pressure and heating, by a heater coupled to the inlet flowline, the carbon dioxide to a specified temperature upstream of the first flow line and the second flow line, such that the first portion of the carbon dioxide entering the flow-through electric generator at the specified pressure and the specified temperature is in a gaseous state;
- generating electrical power by the flow-through electric generator in response to the first portion of the carbon dioxide flowing across the turbine wheel, wherein the electrical power is generated upon rotation of a permanent magnet rotor surrounded by a stator, wherein the permanent magnet rotor and the stator are disposed within the hermetically sealed housing, wherein the permanent magnet rotor is coupled to the turbine wheel for rotating with the turbine wheel;
- after generating the electrical power, flowing the first portion of the carbon dioxide from the flow-through electric generator to an outlet pipe connected to a carbon dioxide pipeline network;
- flowing at least a second portion of the carbon dioxide from the inlet flow line to a second flow line, wherein the second flow line provides an alternate flow path for the carbon dioxide around the first flow line; and
- recombining the first portion of the carbon dioxide from the first flow line with the second portion of the carbon dioxide from the second flow line, downstream of the flow-through electric generator.

6. The method of claim 5, comprising providing, by a pressure control valve coupled to the second flow line, a constriction of an adjustable size for the second portion of the carbon dioxide flowing in the second flow line to cause the second portion of the carbon dioxide to expand adiabatically across the pressure control valve.

7. The method of claim 6, comprising adjusting the size of the constriction provided by the pressure control valve, thereby adjusting torque applied to the flow-through electric generator.

8. The method of claim 7, wherein the permanent magnet rotor and the stator of the flow-through electric generator are hermetically sealed inline in the first flow line, such that the first portion of the carbon dioxide flows across the turbine wheel and the stator.

9. A system comprising:
- an inlet pipe connected to a carbon dioxide pipeline flowing carbon dioxide;
- a first flow line coupled to the inlet flow line to receive at least a first portion of the carbon dioxide from the inlet flow line;
- a second flow line coupled to the inlet flow line to receive at least a second portion of the carbon dioxide from the inlet flow line and provide an alternate flow path for the carbon dioxide around the first flow line;

an outlet flow line coupled to the first flow line and the second flow line to recombine the first portion and the second portion of the carbon dioxide from the first flow line and the second flow line, respectively;

a first pressure control valve coupled to the first flow line, the first pressure control valve configured to reduce a pressure of the first portion of the carbon dioxide to a specified pressure;

a heater coupled to the inlet flow line, the heater configured to heat the carbon dioxide to a specified temperature upstream of the first flow line and the second flow line, wherein the carbon dioxide at the specified pressure and the specified temperature is in the gaseous state;

a flow-through electric generator coupled to the first flow line, the flow-through electric generator comprising:
a hermetically sealed housing;
a turbine wheel disposed within the hermetically sealed housing and configured to receive the first portion of the carbon dioxide from the first flow line and rotate in response to expansion of the first portion of the carbon dioxide flowing into a radial inlet of the turbine wheel and out of an outlet of the turbine wheel;
a permanent magnet rotor disposed within the hermetically sealed housing and coupled to the turbine wheel and configured to rotate with the turbine wheel; and
a stator disposed within the hermetically sealed housing and surrounding the permanent magnet rotor, wherein the flow-through electric generator is configured to generate electrical power upon rotation of the rotor within the stator, wherein the hermetically sealed housing is configured to prevent the carbon dioxide from escaping the radial inlet of the turbine wheel; and a second pressure control valve coupled to the second flow line, the second pressure control valve configured to provide a constriction of an adjustable size for the second portion of the carbon dioxide flowing in the second flow line, wherein the outlet flow line is connected to a carbon dioxide pipeline network, and the outlet flow line is configured to receive the carbon dioxide that has expanded through the flow-through electric generator.

10. The system of claim 9, comprising a controller communicatively coupled to the second pressure control valve and the flow-through electric generator, wherein the controller is configured to adjust the size of the constriction provided by the second pressure control valve, thereby adjusting torque applied to the flow-through electric generator.

* * * * *